United States Patent [19]

McGuire et al.

[11] Patent Number: 4,709,448
[45] Date of Patent: Dec. 1, 1987

[54] HOCK CUTTING MECHANISM

[75] Inventors: Bernie McGuire; Robert S. Innes; Stefan Pagowski, all of Hamilton, Canada

[73] Assignee: Canadian Bird Equipment Limited, Ontario, Canada

[21] Appl. No.: 942,980

[22] Filed: Dec. 17, 1986

Related U.S. Application Data

[63] Continuation-in-part of Ser. No. 617,550, Jun. 5, 1984, Pat. No. 4,660,256.

[51] Int. Cl.$^4$ .............................................. A22C 21/00
[52] U.S. Cl. ....................................................... 17/11
[58] Field of Search ...................................... 17/11, 52

[56] References Cited

U.S. PATENT DOCUMENTS

| | | | |
|---|---|---|---|
| 4,570,295 | 2/1986 | van Mil | 17/11 |
| 4,635,317 | 1/1987 | van der Eerden | 17/11 |
| 4,653,147 | 3/1987 | van der Eerden | 17/11 |

Primary Examiner—Willie G. Abercrombie
Attorney, Agent, or Firm—Oblon, Fisher, Spivak, McClelland & Maier

[57] ABSTRACT

The invention is a rotary transfer apparatus for transferring poultry carcasses from the shackles on one conveyor line to the shackles on another conveyor line. In particular, the apparatus of the invention can be used for transferring carcasses between a kill line and an evisceration line, a rotary member of the apparatus being positioned between those lines. The transfer apparatus may include a knife mechanism for removing the lower part of the legs of each carcass. The knife mechanism is fixed to the frame of the apparatus at one position on the periphery of the rotary member and acts on the carcasses as they pass that position. The apparatus of the invention is intended in part to replace what is at present in many poultry plants a manual operation.

14 Claims, 23 Drawing Figures

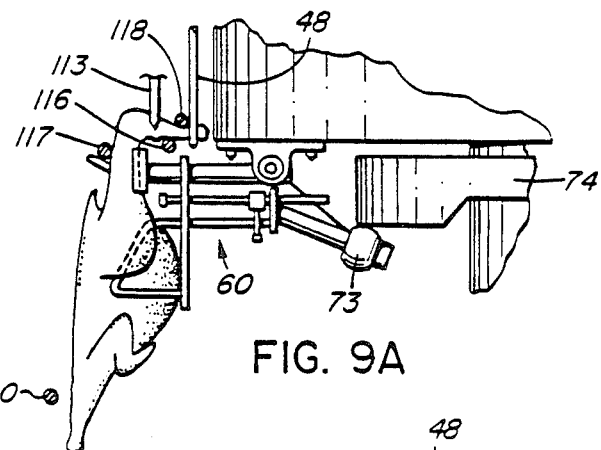
FIG. 9A
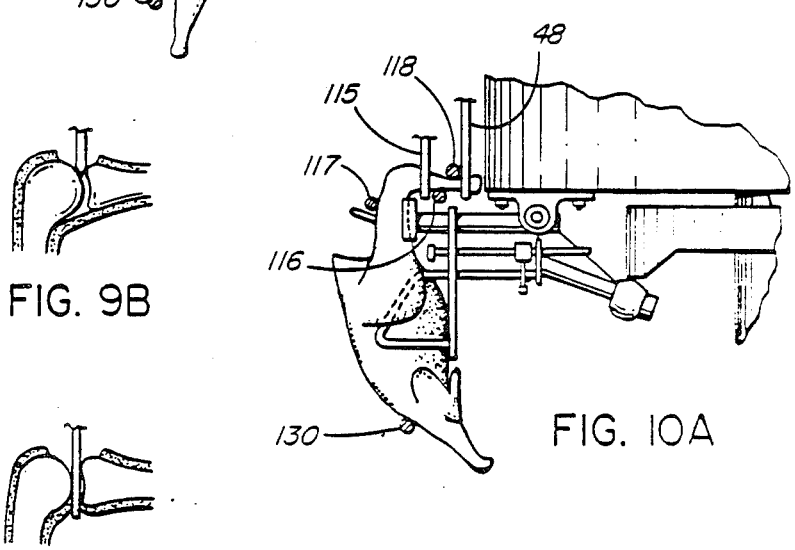
FIG. 9B
FIG. 10A
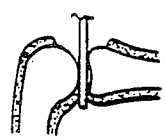
FIG. 10B
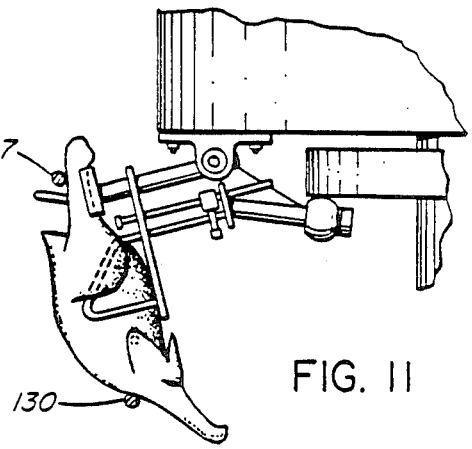
FIG. 11

HOCK CUTTING MECHANISM

This application is a continuation-in-part of application Ser. No. 617,550 filed June 5, 1984 now U.S. Pat. No. 4,660,256 issued Apr. 28, 1987.

This invention relates to a transfer apparatus for transferring items moving on one conveyor line to a second conveyor line. More particularly, it relates to a rotary transfer apparatus for transferring poultry carcasses from shackles on one conveyor line to shackles on a second conveyor line.

A rotary transfer apparatus for transferring poultry from one conveyor line to a second conveyor line is disclosed in U.S. Pat. No. 4,178,659, granted to Michael E. Simonds on Dec. 18, 1979. In that reference, each poultry carcass is maintained on a shackle of the input conveyor line by the capture of the lower part of one of its legs between a pair of parallel spaced rods of the shackle. The rotary member positioned between the two conveyor lines for transferring the poultry carcasses between those lines has a series of equiangularly-spaced stations extending around its circumference, each station having a pair of extending parallel spaced rods of similar configuration to the pair of spaced rods on the shackles of the conveyor lines. The apparatus utilizes guide bars to push a carcass from the pair of spaced rods on a shackle of the one conveyor line onto a respective pair of the spaced rods on the rotary member. After the rotary member has turned approximately 180°, a second guide bar is positioned to push the leg of the carcass from the pair of spaced bars on the rotary member onto the pair of spaced bars of a shackle on the second conveyor line. One disadvantage of this construction, which is remedied by the subject invention, is that a carcass hanging by only one leg can freely rotate on the respectively-associated shackles of the conveyor lines and on the rotary member, and must therefore be re-oriented prior to a further operation such as evisceration. Also, the relatively short distance of interaction between each conveyor line and the rotary member in this construction limits its rate of transfer of poultry carcasses. Although no rotary member is involved, U.S. Pat. No. 4,034,440, granted to M. P. D. van Mil on July 12, 1977, discloses another means for transferring poultry carcasses between conveyor lines; however, the transfer apparatus of this reference would necessarily operate at a slower rate than the previously-described apparatus.

An important feature of the rotary transfer apparatus of the subject invention is a knife mechanism for removing the lower part of the legs (sometimes referred to as "hocks") of the carcasses. With respect to that feature, one reference of interest is U.S. Pat. No. 3,643,293 granted to Jack J. Rejsa on Feb. 22, 1972. In that reference, poultry carcasses are transferred from a picking line conveyor to an evisceration line conveyor by an intermediately-positioned transfer conveyor. A hock cutter apparatus is positioned in the region of adjacency between the picking line conveyor and the transfer conveyor, such that the lower part of the legs of each poultry carcass is cut from the remainder of the carcass prior to the carcass being transferred on the transfer conveyor to the evisceration line conveyor. U.S. Pat. No. 3,522,622, granted to E. J. Crane on Aug. 4, 1970, discloses a hock cutter apparatus in which the lower part of the leg (sometimes referred to as the hock) of the carcass is stretched across a support member prior to that lower leg being separated from the remainder of the carcass by a blade having an initial dull portion and a following sharp portion. The blade has a stationary longitudinal position on the hock cutter apparatus, and the lower part of the legs of the carcass are positioned between the fingers of a drag conveyor which pulls the hock joints (separating the lower part from the upper part of each leg) against the edge of the blade; the blade is driven with a vibratory motion normal to the joint to facilitate its penetration between the parts of the joint.

The subject invention is an apparatus which not only transfers poultry carcasses from one conveyor line to a second conveyor line while maintaining their orientation, but also removes the lower part of the legs from each carcass. Because the transfer apparatus is circular and rotary (being of similar size to the rotary transfer conveyor of U.S. Pat No. 4,178,659), it can be positioned in the limited space between an existing pair of conveyor lines in which manual labour is presently utilized for the transfer operation. As mentioned, the orientation of the carcasses can be maintained by the transfer apparatus of the subject invention in that a carcass held by its legs in a certain orientation on the first conveyor line is deposited in a similar configuration on the second line; thus, operations such as evisceration can be performed on the second conveyor line without requiring that the carcass be re-oriented on that conveyor line. The subject invention is also capable of very high transfer rates i.e. up to 7500 carcass transfers per hour.

In one form, the apparatus for transferring poultry carcasses hung by their legs from the shackles on one conveyor line to the shackles on a second conveyor line comprises a generally circular rotary member having on its periphery at equiangularly-spaced positions a series of holding elements, retention means associated with the holding elements for retaining on each holding element a poultry carcass, and, release means for releasing the hold of the shackle on the one conveyor line on the poultry carcass after that carcass becomes retained on the one of the holding elements. One portion of the path of the first and second conveyor lines is stationed adjacent to respective first and second portions of the path of the periphery of the rotary member. The rotation of the rotary member and movement of the shackles on the two conveyor lines is synchronized such that the movement of the shackles adjacent to the periphery of the rotary member is at the same speed as that periphery. The retention means retains a poultry carcass on a respective holding element as that carcass, which is also held on a shackle on the one conveyor line, becomes adjacent to the periphery of the rotary member. The retention means retains the poultry carcass on the holding element until the rotary member has rotated such that the holding element is adjacent to a shackle on the second conveyor line, at which time the poultry carcass drops under gravity from the holding element onto the shackle on the second conveyor line to be hung by their legs from that shackle.

The release means may sever that portion of the legs of the poultry carcass holding the carcass on the shackle on the one conveyor line from the remainder of the carcass. The retention means may be at least one stationary guide bar extending adjacent to the path of the periphery of the rotary member, which at least one guide bar acts on each carcass to hold that carcass between the at least one guide bar and the respective holding element. The release means may be a stationary elongated knife mechanism extending adjacent to the path of the periphery of the rotary member. In such arrangement, the knife mechanism is positioned such that it contacts the legs of the carcass between that position on the legs of the carcass at which the carcass is held on the shackle on the one conveyor line and that position on the carcass at which the carcass is retained by the retention means. The knife mechanism is oriented such that at least a portion of its contacting edge increases the depth of its displacement into the legs of the carcass as the carcass is rotated on the rotary member.

The contacting edge of the knife mechanism may have a first sharp portion which initially contacts the carcass to sever a first portion of the connective tissue extending between two parts of a leg joint, a dull portion which extends between the two parts of the leg joint to increase the separation between those parts, and a second sharp portion which severs a second portion of the connective tissue extending between the two parts of the leg joint. The knife mechanism may have a first blade and a parallel shorter second blade, those blades being oriented so as to initially contact the carcass together. The second blade has the first sharp portion of the contacting edge of the knife mechanism, and the first blade has the dull portion of that contacting edge. The first blade may also have the second sharp portion of the contacting edge, that second sharp portion being on the trailing edge of the first blade.

The knife mechanism may have a third blade oriented so as to extend in-line with, and behind, the trailing edge of the first blade. In such arrangement, the second sharp portion of the contacting edge of the knife mechanism is partially on the trailing edge of the first blade and partially on the third blade. That part of the second sharp portion of the contacting edge that is on the third blade may face at an inclination the trailing edge of the first blade such that any remnants of the second portion of the connective tissue remaining unsevered after movement across the first and second blades moves against and rides up on the inclined sharp edge of the third blade and is thereby severed. The second blade of the knife mechanism may be positioned radially inward on the rotary member from the first blade.

The joint which is contacted by the contacting edge of the knife mechanism may be the hock joint separating the upper part of the leg from the lower part of the leg, wherein the lower part of the leg is held on the shackle on the one conveyor line and the upper part of the leg is retained with the remainder of the carcass by the retention means. The position of the edge of the first blade that extends between the two parts of the joint may vary radially along the length of the blade such that that edge generally follows the mating surface on the part of the hock joint on the upper part of the leg.

Each of the holding elements may be pivotally connected to the rotary member, the pivot axis of each holding element extending generally tangentially on the rotary member and normal to the symmetry axis of the member. Each holding element may assume alternate angular inclinations relative to the rotary member, one of those angular inclinations being normally assumed by each holding element and the other angular inclination being assumed by each holding element during its movement past the elongated knife mechanism.

Each holding element may comprise a face generally configured to the body contour of a poultry carcass. That face extends generally vertically when the holding element assumes the other angular inclination and that face inclines downwardly, inwardly when the holding element assumes the one angular inclination. The upper edge of that face is configured such that the upper part of each leg is adapted to be recessed therein with the hock joint being proximate of that upper edge. Each poultry carcass may be held on the shackle on the one conveyor line by the outer end of the lower part of each of its legs, the body of the carcass moving into abutment with the face of the holding element when that carcass becomes adjacent to the periphery of the rotary member. In that configuration, the holding element has the one angular inclination, and the shackle and the attached lower part of the legs are positioned radially inwardly on the rotary member from the upper edge of the face of the holding element. Also, in that configuration the shackle is biased radially inwardly on the rotary member such that the lower part of each of the legs is placed in tension.

In the foregoing construction, the elongated knife mechanism is positioned radially inwardly from, but proximate of the path of the upper edge of the face of the holding element, and the knife mechanism is adapted to contact the hock joints of the carcass positioned proximate of that upper edge.

The retention means may comprise a stationary guide bar extending adjacent to the path of the periphery of the rotary member and in sapced relation to the upper edge of the face of the holding element, that guide bar being adapted to act against the upper part of each leg when that leg is recessed in the upper edge of that face. A second stationary guide bar may extend adjacent to the path of the periphery of the rotary member and in spaced relation to a lower edge of the holding element, the second guide bar being adapted to provide support to assist in retaining the carcass on the holding member.

In another form, the invention is a method for transferring a poultry carcass held by the lower part of its legs on a shackle on a first conveyor line to a shackle on a second conveyor line. The method comprises the initial step of moving the carcass on the one conveyor line until the carcass abuts against a corresponding holding element on the periphery of a rotary member positioned between the first and second conveyor lines. The shackle on the first conveyor line during such movement maintains its hold on the lower part of the legs of the carcass, and the first and second conveyor lines are configured such that each of their paths extend adjacent to a respective different portion of the path of the periphery of the rotary member. The method comprises the second step of rotating the rotary member, that rotation bringing the holding element adjacent to a stationary retention means. That retention means, which acts to retain the carcass on the holding element, extends adjacent to the path of the periphery of the rotary member between the portion of that path adjacent to the first conveyor line and that portion of that path adjacent to the second conveyor line. The third step involves severing the lower part of the legs of the carcass from the remainder of the carcass in that portion of the path of the periphery of the rotary member that is adjacent to the first conveyor line. The severing is by means of the stationary knife mechanism positioned to extend adjacent to and along that portion of the path of the periphery of the rotary member. The knife mechanism is positioned relative to the rotary member between the path of the shackle on the first conveyor line and the path of the corresponding holding element. The final step of the method involves dropping the remainder of the carcass from the rotary member onto the shackle on the second conveyor line in that portion of the path of the periphery of the rotary member adjacent to the second conveyor line. The retention means terminates its adjacency to that path immediately prior to the position at which the carcass is dropped.

The first and second conveyor lines may each have a generally rectangular configuration with the one portion of the first and second conveyor lines each being one of the smaller ends of the respective rectangular configuration; in this arrangement, the conveyor line corners adjacent to the rotary member are rounded. The apparatus may further comprise a shackle guide means at each of the rounded corners. Each of the shackle guide means comprises a rotatable shaft pivotally secured to the frame of the apparatus such that its axis of rotation is parallel to that of the generally circular rotary member, and a series of discs symmetrically secured to the rotatable shaft. The discs are secured such that a portion of the path of the periphery of each disc is adjacent to the portion of the respective first or second conveyor lines at the respective rounded corner. Each shaft rotates such that the periphery of each of the discs secured thereto has a speed corresponding to that of the shackles moving on the respective first or second conveyor lines.

At least one of the discs secured to each rotatable shaft may have a series of brackets extending around it periphery spaced such that the stem of a shackle moving on the respective first or second conveyor lines adjacent to that periphery extends between an adjacent pair of brackets. In this embodiment, each of the shackle guide means also comprises a pair of arcuate guide bars secured to the frame of the apparatus to extend along that portion of the path of the periphery of the at least one of the discs that is adjacent to the portion of the respective first or second conveyor lines at the respective rounded corner. One of the arcuate guide bars is positioned radially outward of the path of the shackle moving on the respective first or second conveyor line and the other arcuate guide bar is positioned radially inward of the path of that shackle. In this configuration, a shackle moving around the rounded corner of a respective one of the first or second conveyor lines is restrained radially during such movement by the pair of arcuate guide bars and is restrained angularly during such movement by an adjacent pair of brackets on the periphery of the at least one of the discs.

The arcuate guide bar that is positioned radially inward on the shackle guide means which is positioned on the upstream side of the second conveyor line may extend along at least a part of the second portion of the path of the periphery of the rotary member, and each of the holding elements may have a projecting nose adapted to engage with a respective one of the shackles on the second conveyor line during movement of that shackle along the second portion of the path of the periphery of the rotary member. In this arrangement, the arcuate guide bar retains the shackle on the nose of the respective holding element while a poultry carcass on the respective holding elemetn drops under gravity into the shackle. Each of the holding elements may have a push rod means slidably connected thereto to move generally radially on the apparatus. Each such push rod means is actuated to slide generally radially outward by contact with an arm pivotally secured to the frame of the apparatus in a biased position. Such actuation occurs after movement of the respective holding element past the terminal end of the retention means, and the push rod means pushes the poultry carcass away from the respective holding element during such actuation.

In a still further form, the invention is a knife mechanism for severing the lower legs from a poultry carcass at the hock joint as the knife mechanism and carcass are moved relative to each other. In such arrangement, the lower legs of the carcass are oriented generally normal to the working edges of the knife mechanism and fixed against movement normal to the relative movement. The knife mechanism in this form of the invention comprises first, second and third knife means. The first knife means has a blunt working edge adapted to extend into the hock joint of each leg to increase the spacing between the ball and socket of the joint, with connective tissue being pressed between that ball and socket. The second knife means has a sharp working edge positioned so as to be in the path of the hock joint and being oriented generally parallel to the working edge of the first knife means. The sharp working edge of the second knife means is adapted to sever at least a portion of the connective tissue at the hock joint. The third knife has a working edge oriented to press the connective tissue in a direction opposite to that in which that tissue is pressed by the working edges of the first and second knife members. At least a portion of the working edge of the third knife member is sharp and acts to sever any connective tissue not severed by the second knife means. The sharp portion of the working edge of the third knife means may be the trailing portion of that working edge, and the leading portion of that working edge may be a blunt portion for guiding the connective tissue onto the sharp portion.

In such knife mechanism, the leading portion of the working edge of the second knife means may commence at the same depth in the hock joint as the trailing portion of the working edge of the first knife means. The working edge of the second knife means may be adapted to extend further into the hock joint than the working edge of the first knife means. The working edge of the first knife means may extend in-line with the working edge of the second knife means. The sharp portion of the working edge of a third knife means may be oriented at more of an angle to the path of the hock joint than is the working edge of the second knife means. The sharp portion of the working edge of the third knife means may be contacted by the connective tissue after that tissue has moved past the working edge of the second knife means. The working edge of the third knife means may be laterally displaced from the working edge of the second knife means. The first and second knife means may be integrally connected such that the leading portion of the working edge of the second knife means is an extension of the trailing portion of the working edge of the first knife means. The first, second and third knife means may be oriented so as to contact a poultry carcass being carried on the periphery of a circular rotary member.

In a yet further form, the invention is a device for removing the legs of a poultry carcass, comprising movable support means for supporting the carcass by the legs, and a stationary knife mechanism having a working edge positioned so as to contact the hock joints of the carcass while the carcass is moved on the support means. During such movement, the legs of the carcass are flexed at the hock joints over a rest member on the support means. The knife mechanism has an intial blunt working edge portion which enters between the ball and socket of each hock joint to increase the separation between the ball and socket. The knife mechanism also has a first sharp working edge portion following the blunt portion for severing at least a portion of the connective tissue at the hock joint. The first sharp working edge extends further into the hock joint than the blunt working edge. The knife mechanism also has a second sharp working edge portion following the first working edge portion and extending across the path of the connective tissue for severing any remaining connective tissue at the hock joint.

In this form of the invention, the stationary knife mechanism may be formed from three connected parts. The first part has the initial blunt working edge portion of the mechanism, and the second part has the first sharp working edge portion of the mechanism. The third part has the second sharp working edge portion of the mechanism and is also comprised of a guide means for directing the remaining connective tissue at each hock joint to the second sharp working edge portion. The movable support means may be a generally circular rotary member, and each rest member may be positioned on the periphery of the rotary member such that the legs of each carcass extend generally toward the center of the rotary member. The working edge of the stationary knife mechanism may be accurately contoured such that the leading portion of that working edge is a greater radial distance from the center of the rotary member than is the trailing portion of that working edge.

The apparatus of the subject invention will now be more fully described by means of a preferred embodiment, utilizing the accompanying drawings, in which:

FIG. 9A is a perspective side view of the carriage member mounted on the transfer apparatus at the position marked IX in FIG. 1;

FIG. 9B is a detailed sectioned view of the relative positions of the hock joint and the knife mechanism of FIG. 9A.

FIG. 10A is a perspective side view of the carriage member mounted on the transfer apparatus at the position marked X in FIG. 1.

FIG. 10B is a detailed sectioned view of the relative positions of the hock joint and the knife mechanism of FIG. 10A.

FIG. 11 is a perspective side view of the carriage member mounted on the transfer apparatus at the position marked XI in FIG. 1;

Figure 1:
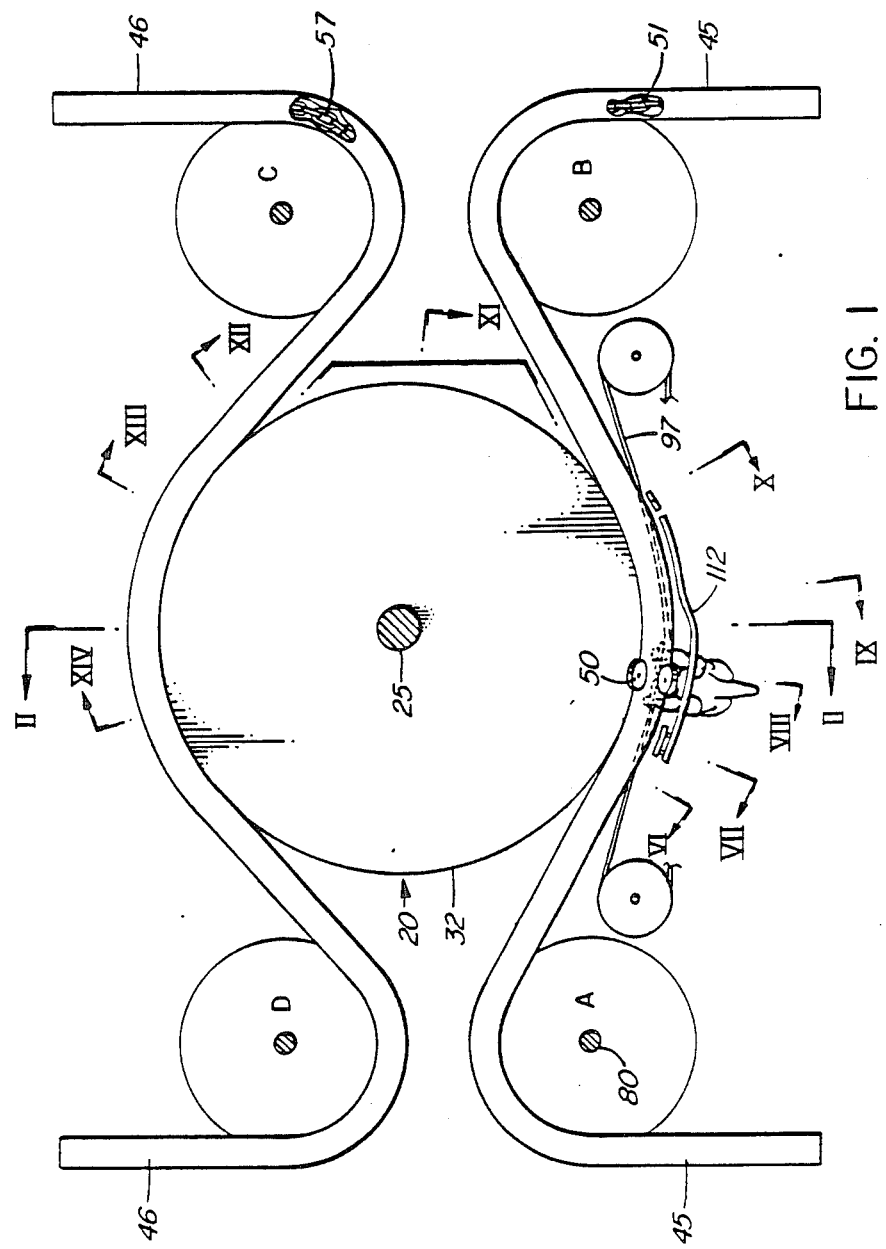
FIG. 1 is a plan view of a transfer apparatus embodying the subject invention.

With reference to FIG. 1, the transfer apparatus has a rotary member or carousel generally designated as 20. Rotary member 20 is generally shown in side view in FIG. 2, that view being taken along the section II—II of FIG. 1. Rotary member 20 is mounted in a frame generally designated as 21 and having a series of vertical members 22 and a series of upper cross members 23 and lower cross members 24. The shaft 25 of the rotary member 20 is mounted generally centrally in the frame between an upper bearing 26 connected to one of the upper cross members 23 and a lower bearing (not shown) mounted in a cradle 27 supported by lower cross members 24. The lower end of the shaft 25 extends through the lower bearing and has a gear wheel 28 mounted to its lower end. The gear wheel 28 is connected by a chain 29 to the output sprocket of a reduction gear box (not shown) driven by a motor (not shown). An alternate means for rotating rotary member 20 will subsequently be described.

A pair of discs 30 and 31 are mounted on shaft 25 to extend normal to the rotational axis, and a stainless steel drum 32 has its ends mounted on the outer perimeter of those discs. Approximately one-third of the distance from the lower edge of drum 32, a pair of rings 33 and 34 are mounted concentrically on drum 32 in a generally parallel orientation. The purpose for the pair of rings 33 and 34 will subsequently become clear. Drum 35 has a first set of teeth 36 and a second set of teeth 37 extending circumferentially therearound, the second set of teeth 37 being positioned above the first set of teeth 36. The purpose of the two sets of circumferential teeth on drum 32 will subsequently be described.

Figure 2:
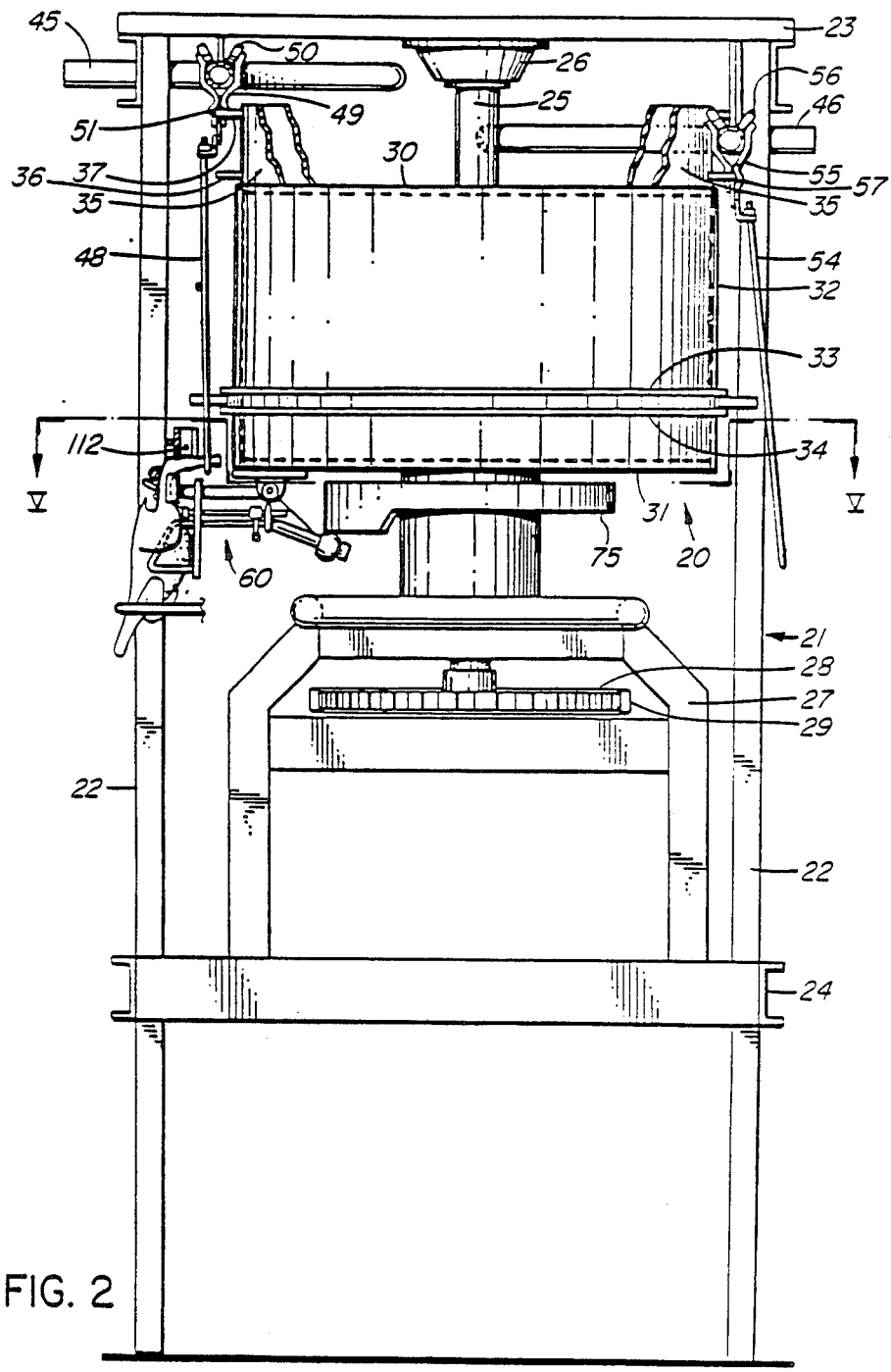
FIG. 2 is a partially-sectioned view of the transfer apparatus, that view being taken through II—II of FIG. 1.

With reference to FIG. 1, rotary member 20 is surrounded by four small rotary members, generally designated as A, B, C, and D. The shaft of each of those four small rotary members is secured at its upper and lower ends by bearings to frame 21. As also shown in FIG. 1, first and second conveyor lines have tracks 45 and 46, respectively. The first conveyor line, to which track 45 belongs, is the "kill line" of the poultry plant, along which line the poultry are slaughtered, and their feathers and claws removed. The second conveyor line, to which track 46 belongs, is the "evisceration line" on which the poultry is eviscerated and their heads removed. The first and second conveyor lines each have a series of shackle assemblies mounted to move along their tracks, those shackle assemblies being generally illustrated in FIGS. 1, 2, 3 and 4. The tracks 45 and 46, which are circular in cross-section, are secured to frame 21. Each shackle assembly on the first conveyor line consists of a shackle 48 secured to extend from a yoke consisting of a pair of connected brackets 49 each bracket having a wheel 50 rotatably mounted thereon, as shown in FIG. 2. A portion of a chain 51 extending below track 45 is secured to each shackle assembly and acts to provide proper spacing between those assemblies, as well as provide propulsion to those assemblies. The propulsion for the first conveyor line is provided by the meshing of the upper set of teeth 37 on drum 32 with the vertical chain links of chain 51, each of the teeth 37 being circumferentially spaced to extend through the center of adjacent vertical links in chain 51.

Figure 3:
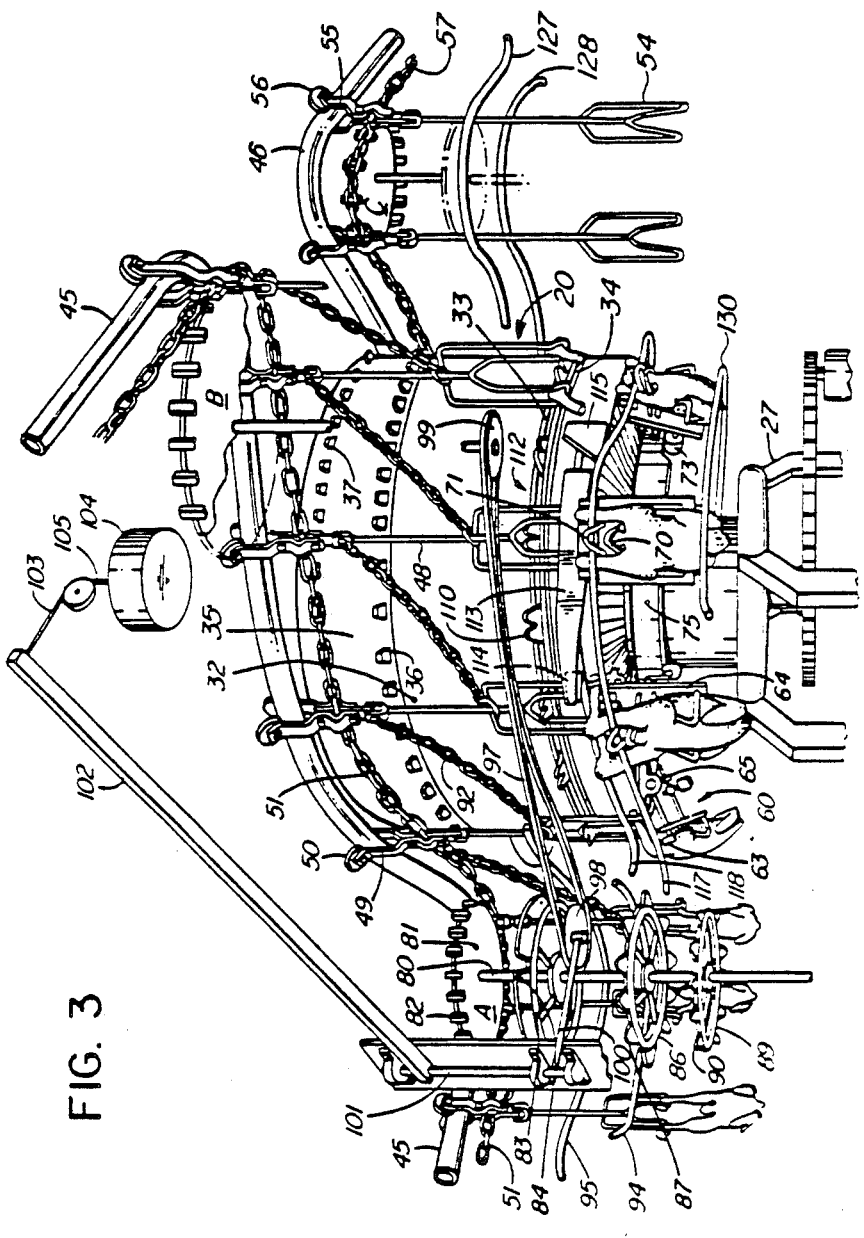
FIG. 3 is a side perspective view of the transfer apparatus that view being from the left side of FIG. 1.
Figure 5:
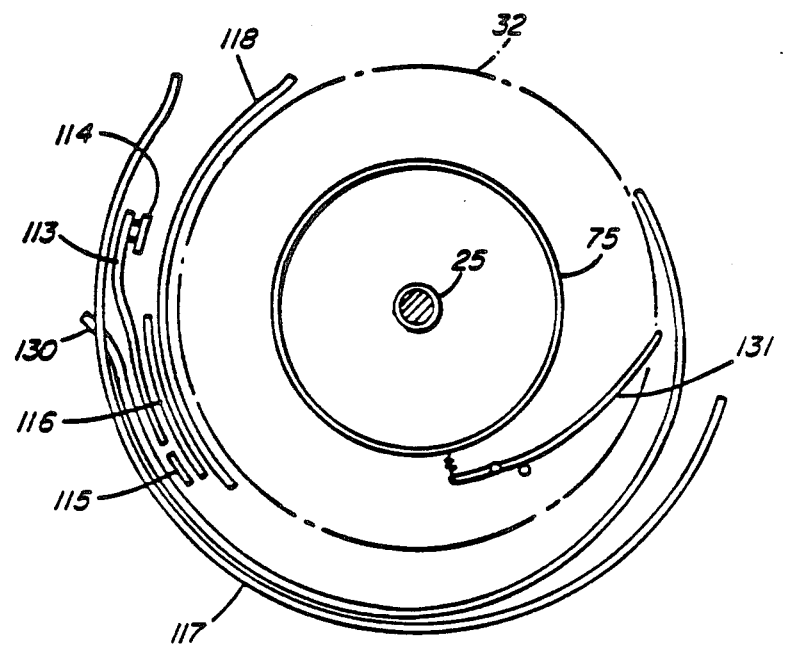
FIG. 5 is a partially-sectioned plan view of the transfer apparatus along the section V—V of FIG. 2.

With respect to FIGS. 1, 3 and 5, rotation of rotary member 20 moves the shackle assemblies on track 45 clockwise such that they move clockwise around small rotary member A, counter-clockwise around rotary member 20 and clockwise around small rotary member B.

Figure 4:
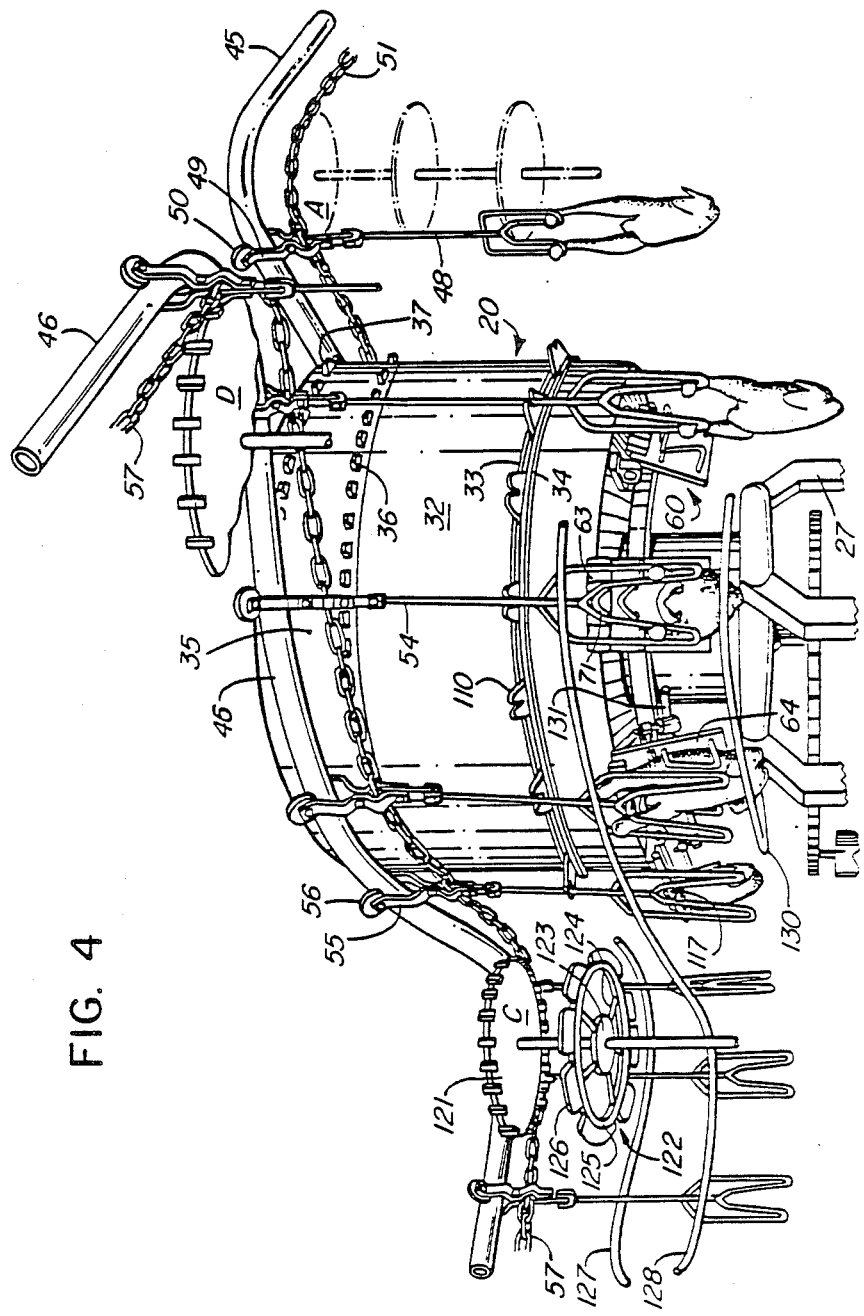
FIG. 4 is a side perspective view of the transfer apparatus, that view being from the right side of FIG. 1.

With reference to FIGS. 1 and 4, the second conveyor line has a track 46, a portion of which extends on an opposite side of rotary member 20 from track 45. Shackle assemblies move in a clockwise direction on track 46, moving clockwise around small rotary member C, counter-clockwise around rotary member 20, and clockwise around small rotary member D. As with the shackle assemblies on the first conveyor line, each shackle assembly on the second conveyor line comprises a yoke and an attached shackle, the shackle being designated 54 and the yoke attached to its upper end consisting of a pair of brackets 55 on each of which are mounted a wheel 56. A chain 57 extends below track 46 and is secured to the pair of brackets 55 to provide the appropriate spacing and the propulsion to the shackle assemblies of the second conveyor line. The lower set of teeth 36 on drum 32 mesh with chain 57, each of the teeth 36 extending through one of the vertically-oriented links of chain 57. As can be seen from FIGS. 3 and 4, each shackle 48 on the first conveyor line is differently configured from each shackle 54 on the second conveyor line. Both types of shackles have a long stem which extends downwardly from the yoke suspending it from the tracke but there are differences in the configuration of the lower portions of each kill shackle 48 and each evisceration shackle 54. Those differences are the greater length of each shackle 48, the horizontal cross-piece on each shackle 48, and the out-of-plane curvature on the lower tips of each shackle 48. As will subsequently be more fully described, a poultry carcass hangs from each shackle 48 by the outer end of the lower part of its legs, whereas each shackle 54 retains a carcass by the remaining part of the hock joints after the lower part of the legs has been removed on rotary member 20.

Figure 6:
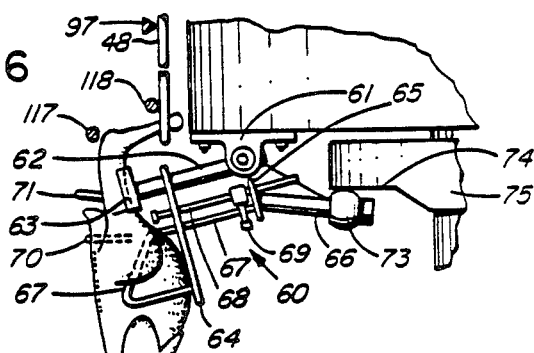
FIG. 6 is a perspective side view of a carriage member mounted on the transfer apparatus at the position marked VI of FIG. 1.

Secured to the lower disc 31 on rotary member 20 so as to extend adjacent to the lower edge of drum 32 are a series of tiltable carriages generally designated as 60. Approximately twenty such carriages are positioned at equiangularly spaced intervals adjacent to the lower periphery of drum 32, the exact number depending upon the distance between the shackles on the conveyor lines (that distance being the same on both lines), and the diameter of drum 32; in the preferred embodiment, the shackles are spaced approximately 6 inches apart, drum 32 is 36.3 inches in diameter, and nineteen carriages are installed. As shown in FIG. 6, each carriage 60 has a support bracket 61 to which is pivotally secured one end of an elongated support arm 62. The other end of support arm 62 has secured thereon a specially-configured support rest 63, against which the upper part of the legs of the poultry are positioned. A plate 64 is secured intermediate of the ends of, and normal to, support arm 62, the support arm 62 extending through and being welded to plate 64 proximate of the one edge of that plate. A smaller plate 65 extends parallel to plate 64 at the pivotal connection to support racket 61. Extending on an opposite side of the pivotal connection from support arm 62 is a lever arm 66, that lever arm being angularly offset from the support arm 62. Extending between and rigidly secured to plates 64 and 65 are a pair of rods 67, each rod being welded to plates 64 and 65 to maintain those plates in co-planar spaced relation; each rod 67 extends through plate 64 and is configured into an arm to create a centering guide for a poultry carcass suspended from support rest 63. Slidably mounted to extend through both plates 64 and 65 are a pair of push rods 68 having an enlarged end extending beyond plate 64 and an adjustably-positionable cam member 69 fixed thereto intermediate of plate 64 and 65. A guide bar 70, shown in FIGS. 3 and 6, is welded to plates 64 and 65 to extend between those plates. Guide bar 70 has its arcuate central portion extending generally normal to, and on the outer face of, plate 64 below support rest 63. A further arcuate guide bar 71 is fixed to support rest 63 to extend outward from that rest at a slight upward angle. On the outer end of lever arm 66 an annular wheel 73 is mounted, that wheel riding on the ring-like surface 74 defined by the lower edge of a stationary circular cylinder 75 mounted to cradle 27 therebelow. As shown in the series of drawings, FIGS. 6 to 14 inclusive, each carriage may assume either a generally horizontal position as in FIGS. 7, 8, 9 and 10, or a second inclined position as shown in FIGS. 6, 11, 12, 13 and 14. The reason for, and the relative positioning of, the two angular inclinations of each carriage 60 should subsequently become clear.

With the first and second conveyor lines extending around small rotary members A, B, C and D, as previously described, a poultry carcass entering the apparatus on the first conveyor line (see FIG. 1) moves clockwise around small rotary member A, counter-clockwise for almost a complete revolution of rotary member 20, and clockwise around small rotary member D. Once a poultry carcass has moved around the small rotary member A to become adjacent to rotary member 20, a retention means secures the carcass to rotary member 20, and almost immediately thereafter, the hold of the first conveyor line on the carcass is removed. The carcass is then retained on rotary member 20 for approximately a further one-half rotation of that member, after which the retention means on rotary member 20 terminates and the carcass falls under gravity onto one of the shackle assemblies moving along the second conveyor line. The release of the first conveyor line on the poultry carcass is obtained by severing the lower part of the legs of the carcass at the hock joint after the carcass has been retained on the rotary member 20. The lower part of the legs of the carcass remain on the shackle assembly of the first conveyor line and are carried off around small rotary member B to be disposed to prior to the shackle assembly being loaded with a further poultry carcass.

Each of the small rotary members A,B,C, and D have a central axle fixed to the frame of the apparatus. On each axle, a driving disc extends normal to the axle and has its center rigidly connected to the axle. A series of teeth extend around the periphery of each driving disc so as to be adjacent to the vertically-oriented links of the chain of the respective conveyor line. With reference to FIG. 3, small rotary member A has an axle 80 to which is rigidly connected a driving disc 81 having a series of teeth 82 extending on its periphery. The teeth 82 are equiangularly spaced from each other such that adjacent ones of the teeth abut adjacent vertical links of chain 51. It can be appreciated that this construction results in the four small rotary members rotating in synchronized relation with rotary member 20.

In the preferred embodiment, rotary member 20 is rotatably powered by its connection to a motor, and the four small rotary members are rotatably powered by their positive engagement with chains 51 and 57 which also positively engage rotary member 20. A possible alternate method of powering the apparatus is to directly drive one or more of the small rotary members by a motor, that small rotary member or members in turn providing rotational power to the other rotary members; in particular, by providing driving power to either small rotary members A and C or B and D a reduction in the amount of the driving power required may be realized.

Besides their driving discs, small rotary members A and D each have three further discs extending normal to their axle, each disc being rigidly connected at the center to the axle. As shown in FIGS. 3, the disc 83, which is immediately below driving disc 81, has a series of wire brackets 84 extending on its periphery, the spacing between each adjacent pair of the brackets 84 being just large enough to receive the stem of a shackle 48 therein; alternately the brackets 84 could be formed from nylon sheet. The purpose of disc 83 is to position and stabilize the shackle assemblies as they are carried around small rotary member A at high speed. Below disc 83 is a further disc 86 having a similar diameter to discs 81 and 83. As with disc 83, disc 86 is utilized for positioning and stabilizing shackle assemblies moving around small rotary member A. Disc 83 has ten adjacent brackets around its periphery, and disc 86 has ten plastic spacer 87 is adapted to extend between the inner pair of legs at the low end of the shackle 48, as shown in FIG. 3. The fourth and lowest disc fixed to axle 80 is disc 89 which has a series of ten wire brackets 90 equiangularly positioned around its periphery. Each poultry carcass is adapted to extend down between an adjacent pair of the brackets 90. As can be seen from FIG. 3, each of the brackets 90 is centered below one of the brackets 84, whereas each of the plastic spacer members 87 are angularly positioned between adjacent brackets on those other two discs.

Since small rotary members B and C do not have poultry carcasses moving therearound, it can be appreciated that the lower pair of discs, i.e. 86 and 89 on small rotary member A, are not required. Those two rotary members have only a driving disc to contact the chain on their respective conveyor lines and have a disc similar to disc 83 to prevent excessive sway of the shackles as they move around those small rotary members.

With respect to the first conveyor line, each of the shackle assemblies are connected by a chain 92 to the shackle assembly two positions removed from it. With reference to FIG. 3, it should be mentioned at this time that only every second shackle assembly has been illustrated to enhance clarity. It can be seen that each of the stabilizing chains 92 extend from the pair of brackets 49 at the top end of each shackle assembly to connect to that position on the second-following shackle assembly at which the cross-piece and the stem of the shackle intersect. A further way in which the motion of the shackle assemblies is stabilized during travel around the small rotary members and rotary member 20 is by means of guide bars 94 and 95 extending around the periphery of the small rotary members as illustrated in FIG. 3. Small rotary members A and C generally have an outer guide bar and an inner guide bar extending around that portion of the periphery to which the shackle assemblies move adjacently. As an illustration, FIG. 3 illustrates an inner guide bar 94 positioned inside of the path of the shackles 48, and an outer guide bar 95 Positioned outside of the path of the shackle 48, whereby the shackles 48 are constrained to very limited radial movement as they move around small rotary members A. Similarly, shackles 54 are positioned between guide bars 127 and 128. A still further means of stabilizing the movement of the shackle assemblies 48 involves a tensioning belt 97 mounted to extend between a first pulley 98 and a second pulley 99, as shown in FIG. 3. The pulley 99 is pivotally connected to the frame of the apparatus, whereas the pulley 98 is pivotally connected to one end of an arm 100, the other end of which arm is rigidly connected to one end of a shaft 101, which shaft is pivotally connected to the frame of the apparatus. The other end of shaft 101 is rigidly connected to one end of an extended arm 102, the other end of that arm being laterally acted on by a cable 103 connected to a suspended weight 104 by a pulley 105. The belt 97 is placed in tension by this arrangement and acts to press radially inwardly on the shackles 48 that are moving tangentially on rotary member 20. Thus, those shackles are restrained against radially outward movement on rotary member 20. A further reason for the need for the tensioning belt 97 will subsequently become obvious.

It was earlier mentioned that drum 32 had a pair of spaced ring members 33 and 34 extending around its periphery approximately one-third of the height of drum 32 from its lower edge. The purpose of those rings is to hold plastic spacers 110 as shown in FIGS. 3 and 4. Spacers 110 are utilized to further stabilize the shackle assemblies as they move around the periphery of rotary member 20. From a comparison of FIGS. 3 and 4 it can be seen that each spacer 110 occupies a different position relative to a shackle 48 on the input conveyor line than it does on a shackle 54 on the output conveyor line. This is due not only to the fact that the track of the output conveyor line is lower than the track of the input conveyor line, but also to the fact that the shackles 54 are longer than the shackles 48. It can be seen that the lower tips of each shackle 48 extend generally adjacent to the lower edge of drum 32 whereas the lower end of the stem of each of the shackles 54 is adjacent to that lower edge of drum 32 with the remainder of each shackle 54 extending below that edge.

As a poultry carcass moves counterclockwise around the periphery of rotary member 20 between small rotary members A and D (see FIG. 1) the lower part of the legs is removed from each carcass at the hock joint by the knife mechanism generally designated as 112 (see FIG. 3) which extends proximate of a portion of the lower edge of drum 32 and is supported by an arm extending from one of the vertical members 22 (see FIG. 2). Knife mechanism 112 consists of three separate blades, 113, 114 and 115, connected in the configuration illustrated in FIGS. 3 and 5. Blades 114 and 115 are shorter than blade 113, blade 114 extending in spaced parallel relation to the leading portion of blade 113 and blade 115 extending in-line with the trailing portion of blade 113. Blade 114 has a sharp lower edge, and that blade increases in depth between its leading and trailing edges. Blade 113 has the curved profile illustrated in FIG. 5, its leading portion extending in an arc positioned further from the symmetry axis of rotary member 20 than does an arc along which the trailing portion extends. The leading portion of blade 113 increases in depth along its length and has a dull lower edge, while the trailing portion of blade 113 has a generally uniform depth and a sharp lower edge. Blade 115 extends generally in-line with the trailing portion of blade 113 and has a sharp front edge inclined such that the upper end of that edge is further displaced from blade 113 than is the lower end. Also, for a reason that will subsequently be explained the lower end of blade 115 commences at an elevation on the apparatus slightly below that of the sharp trailing edge of blade 113. Instead of being connected to the frame of the apparatus, the forward end of blade 113 may have an eccentric pulley mounted thereon, rotation of that pulley creating a vertical oscillatory motion; in such case, the forward end of blade 113 would be held on the frame of the apparatus by a spring or similar means. The trailing end of blade 113, instead of being connected to the frame of the apparatus, may be resiliently supported on the frame through a spring steel strip.

As shown in FIGS. 5, 9 and 10, a support bar 116 is mounted to the end of knife mechanism 112 or to the frame of the apparatus to extend proximate of, and radially inward on the apparatus from, the lower edge of both blade 115 and the trailing portion of blade 113. The purpose of support bar 116 will become evident when the operation of the apparatus is described.

A pair of peripheral guide bars 117 and 118 are secured to the frame of the apparatus to extend proximate of and in spaced relation to the lower edge of drum 32. The guide bar 117 extends adjacent to approximately half the perimeter of drum 32, as can be seen in FIGS. 3 and 4. Guide bar 117 is radially positioned relative to rotary member 20 so as to extend in almost touching relationship with the support rest 63 of each carriage 60. That portion of guide bar 117 between small rotary members A and B is positioned slightly higher and radially inward from the remaining portion of that guide bar, and a short sloping portion of guide bar 117 connects those other two portions. The reason for the change in the vertical elevation and radial position of the two portions of guide bar 117 is to accommodate the change of inclination of each carriage 60 during rotation of rotary member 20. As can be seen from FIG. 3, guide bar 118 is shorter than guide bar 117 and is positioned radially inwardly from guide bar 117 on rotary member 20. Guide bar 118 is positioned to extend in a horizontal plane approximately one inch higher than the horizontal plane along with the initial portion of guide bar 117 extends. The lower edge of blade 113 slopes downwardly along its dull leading portion and extends between guide bars 117 and 118 such that its dull leading end is below those guide bars. The lower trailing portion of guide bar 118 is positioned sufficiently below the lower end of shackle assemblies moving thereacross on track 45 that no interference results. Also, as can be seen from FIG. 3, the initial portions of guide bars 117 and 118 are curved so as to accept movement thereagainst of items being rotated on rotary member 20. Similarly, the other guide bars on the apparatus, such as guide bars 94 and 95, have their forward ends turned so as to make a smoothier initial contact with the shackles.

FIG. 4 is a perspective view of that portion of rotary member 20 lying between small rotary members C and D. As with small rotary member B, small rotary member C has only two discs, driving disc 121 which engages with chain 57 of the second conveyor line and a second disc 122 mounted under driving disc 121 to engage the stems of the shackles 54. The disc 122 may be in the form of a wheel having a hub 123 from which extends five equiangularly spaced spokes 124 connecting to a rim 125 on which are mounted ten equiangularly-spaced plastic spacers 126. The spacers 126 are designed to better receive the stem of the shackle. An outer guide bar 127 is mounted on the frame of the apparatus to extend along the periphery of small rotary member C, and a longer guide bar 128 also extends around that periphery and extends also around a portion of the periphery of rotary member 20. A shackle assembly being pulled along track 46 by chain 57 enters between guide bars 127 and 128, as shown in FIG. 4, and the stem of the shackle of that assembly is caught between a pair of adjacent plastic spacers 126 during its movement around small rotary member C. The shackle assembly which at this point is empty, is stabilized by its confinement between the two guide bars and the plastic spacers 126; without such stabilization, the shackles would not remain generally vertical but would extend at an angle to the vertical due to inertia and drag created by contact with the guide bars.

Figure 12:
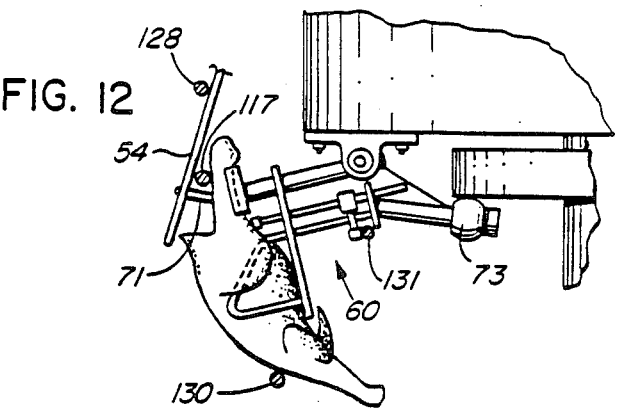
FIG. 12 is a perspective side view of the carriage member mounted on the transfer apparatus at the position marked XII in FIG. 1.
Figure 13:
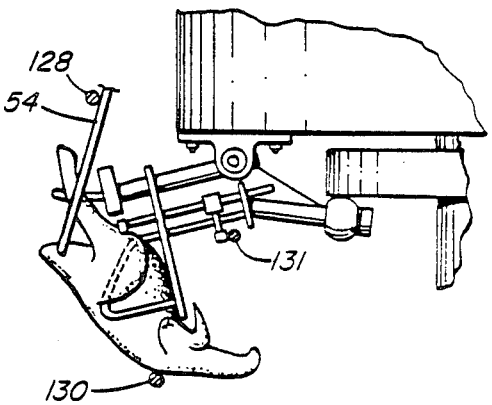
FIG. 13 is a perspective side view of the carriage member mounted on the transfer apparatus at the position marked XIII in FIG. 1.
Figure 14:
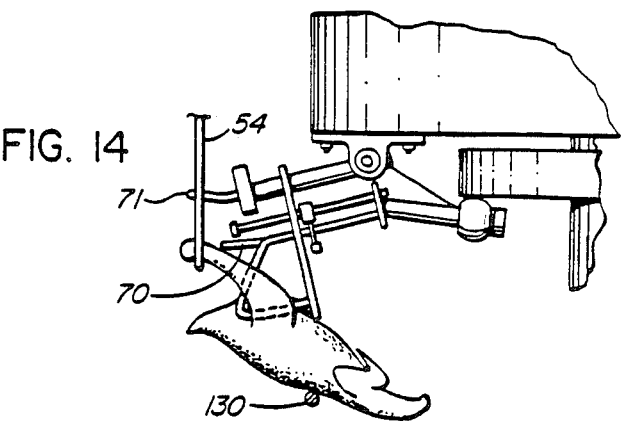
FIG. 14 is a perspective side view of the carriage member mounted on the transfer apparatus at the position marked XIV in FIG. 1.

As shown in FIGS. 3, 4 and 9A, 10A and 11 to 14, a further guide bar 130 extends around the periphery of rotary member 20 from approximately midway between small rotary members A and B to approximately midway between small rotary members C and D, guide bar 130 being positioned radially outside of, but proximate to, the path followed by the lower edge of the carriages 60. Between small rotary members C and D, guide bar 130 extends radially inwardly, the terminal portion of guide bar 130 being generally below the path traced by the pivot axes of the carriages 60. The purpose of guide bar 130 will become clear when the operation of the subject apparatus is described. A pivotally-mounted biased arm 131 extends under lower disc 31 of rotary member 20 in a direction oriented radially outwardly in a counter-clockwise direction. The radially-outward end of arm 131 extends into the path of the cam members 69 on each carriage 60. As each carriage 60 is rotated on rotary member 20, the cam members 69 abut against the radially-outward end of the arm 131, the push-rod 68 to which cam members 69 are attached being slid outwardly on the carriage 60 by such abutment, as shown in FIGS. 12 and 13.

The operation of the subject apparatus will next be described in terms of the transfer of a poultry carcass from the first conveyor line to the second conveyor line, removal of the lower part of the legs of the carcass occurring during such transfer.

With reference to FIG. 3, a poultry carcass held on a shackle 48 suspended by a yoke from track 45 is pulled along that track 45 by chain 51, which in turn is being powered by the motor-driven rotation of rotary member 20. As the shackle 48 moves adjacent to the periphery of small rotary member A, the stem of shackle 48 enters between an adjacent pair of guide brackets 84 on disc 83, a spacer 87 on disc 86 moves between the inner legs of shackle 48, and a pair of adjacent guide brackets 90 on disc 89 assume opposite positions on the carcass. Shackle 48 is also constrained to move between the inner guide bar 94 and the outer guide bar 95. As the carcass becomes adjacent to drum 32, the lower part of its legs are pulled across the support rest 63 of an associated carriage 60, the upper part of the legs coming into abutment with a pair of specially-contoured recesses in the support rest 63. The carriage 60 is in the inclined position at that location, the annular wheel 73 of the carriage 60 riding on the higher portion of the ring-like surface 74. The particular shackle 48 supporting the carcass assumes a radially-inward position on rotary member 20 relatives to support rest 63 such that the lower part of the legs of the carcass are stretched between the jaws of shackle 48 and support rest 63. Arcuate guide bars 70 and 71 extend between the upper part of the legs of the carcass on support rest 63. The lower end of shackle 48 is initially directed radially-inward on rotary member 20 by inner guide bar 94, but that inwardly-directing force is subsequently applied by the belt 97. The weight 104 is adjusted such that the tensioning belt 97 applies the appropriate force to the stem of the stackle 48 to create the appropriate tension in the lower part of the legs of the carcass. Simultaneously with the tensioning force applied on shackle 48, the carriage 60 rotates to a generally horizontal position when its annular wheel 73 rides onto a lower portion of the ring-like surface 74. The change in orientation of carriage 60 can be seen clearly in Figures 6 and 7. As carriage 60 rotates to a horizontal position, the legs of the carcass move into abutment with the guide bars 117 and 118. The upper part of the legs of the carcass are sandwiched between the support rest 63 and the guide bar 117, the hock joint sitting above that position and preventing downward movement of the carcass on the carriage. The lower part of the legs of the carcass are pushed upwardly into abutment against guide bar 118, that guide bar preventing the outer end of the lower part of the legs of the carcass from riding up in the jaws of shackle 48. The pair of rods 67 secured to plate 64 prevent sideways movement of the carcass on carriage 60, and guide bar 70 on plate 64 also assists in holding the carcass in position.

Figure 7B:
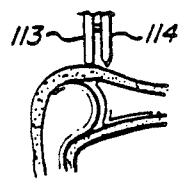
FIG. 7B is a detailed sectioned view of the relative positions of the hock joint and the knife mechanism of FIG. 7A.
Figure 7A:
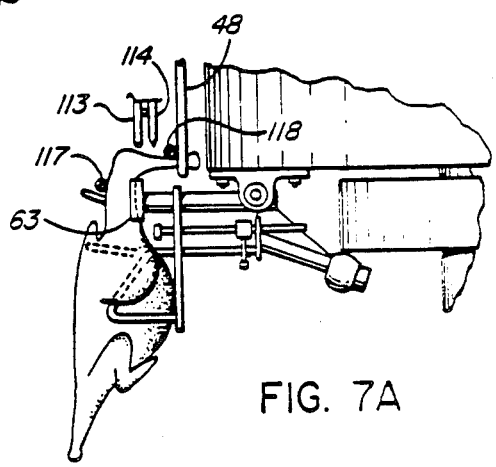
FIG. 7A is a perspective side view of the carriage member mounted on the transfer apparatus at the position marked VII in FIG. 1.
Figure 8:
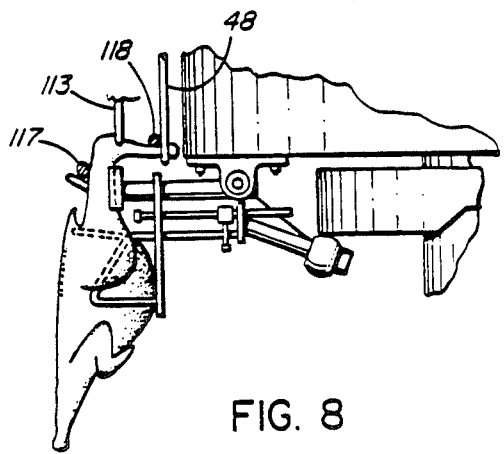
FIG. 8 is a perspective side view of the carriage member mounted on the transfer apparatus at the position marked VIII in FIG. 1.

With rotation of rotary member 20, the hock joints above support rest 63 simultaneously move under the dull edge of blade 113 and the sharp edge of blade 114. Blade 114 severs tendons extending on the upper surface of the lower part of the leg of the carcass, the blade 113 moves downward between the two parts of the hock joint to separate those two parts, the connective tissue between those parts being thereby stretched. As can be seen in FIG. 7, the blade 113 is positioned radially inward of but adjacent to support rest 63, and radially outward of blade 114. Blade 114 is in turn positioned radially outward of guide bar 118. With further rotation of rotary member 20, the dull edge on the forward portion of blade 113 follows the contour of the mating surface on the two parts of the hock joint, i.e. blade 113 is contoured such that its contacting edge moves closer to the axis of symmetry of rotary member 20. The sharp edge on the trailing portion of blade 113 then contacts the connective tissue between the two parts of the hock joint, severing or almost severing both that tissue and tendons on the underside of the hock joint. Support bar 116 supports the lower part of the legs during such cutting (see FIG. 9) to prevent the tendons on the underside of the hock joint from moving downwardly with the edge of the blade. Any tendons or other connective tissue remaining unsevered after moving past blade 113 impinge on and ride up on the sharp front inclined edge of blade 115, the tendons or other tissue being thereby severed. The severed lower part of the legs are retained on shackle 48 and the remainder of the carcass is retained on the carriage 60 by the capture of the hock joints between support rest 63 and guide bar 117.

Immediately after carriage 60 moves past the end of knife mechanism 112, the carriage resumes its inclined position when annular wheel 73 returns to the upper portion of the ring-like surface 74. Coinciding with such change in orientation of carriage 60, guide bar 117 assumes a new path, downward and radially outward from its former path, as illustrated in FIG. 3. As shown in FIG. 11, support bar 116 has meanwhile terminated and guide bar 130 commenced. Guide bar 130 assists in supporting the carcass on carriage 60. Shackle 48 holding the lower part of the legs of the carcass moves off across guide bar 117 and around small rotary member B. Shackle 48 will subsequently be emptied of its contents, and reloaded with fresh poultry.

The carriage 60 with the retained carcass thereon moves in the inclined position on rotary member 20 to a position adjacent to small rotary member C. As shown in FIG. 4, empty evisceration shackles 54 are moving clockwise on the second conveyor line, the position of each of those shackles being synchronized with the position of a respective one of the carriages 60. Shackle 54 is stabilized in its rotation around small rotary member C by its capture between outer guide bar 127, inner guide bar 128, and a respective adjacent pair of spacers 126 on disc 122.

As the shackle 54 that is associated with the carriage 60 of interest becomes adjacent to drum 32 of rotary member 20, the lower end of the shackle abuts against the respective carriage 60 at that position on rotary member 20 and against the upper part of the carcass on that carriage. Outer guide bar 127 has at this point terminated, and shackle 54 is retained between carriage 60 and guide bar 128. Lateral movement of shackle 54 is prevented by the stem of the shackle moving into the groove of a respective one of the spacers 110 held by rings 33 and 34 on drum 32.

As shown in FIG. 4, the termination of guide bar 117 frees the carcass from its retention on the support rest 63 of carriage 60. Simultaneously, the cam members 69 on the carriage 60 move into abutment with the biased pivotal arm 131, that action pushing slide rods 68 outwardly through plate 64 such that the enlarged ends on those push rods abut against the carcass to push it radially outward from rotary member 20, as shown in FIGS. 12 and 13. The effect of the various foregoing actions on the carcass is to rotate it such that its hock joints fall into the jaws of the respective shackle moving with the carriage 60. The shackle 54 has its lower ends vertically positioned such that the joints of the carcass enter between the wide spacing at the top of the inner and outer legs of the shackle jaws, those joints then dropping between those inner and outer legs of the shackle to be retained at the lower end thereof.

The guide bars 128 and 130 then terminate, and the shackle 54 moves off around small rotary member D, the carcass being retained on that shackle by gravity for subsequent evisceration and other procedures. The small rotary member D is similar to small rotary member A in that it has four co-planar discs adapted to stabilize the shackle and attached carcass as they move at high speed therearound. As with the other three small rotary members, small rotary member D also has a pair of guide bars extending around its periphery to prevent radially-outward motion of the shackle and its contents as they move therearound.

The preferred embodiment which has just been described has reference to the carcasses of New York dressing chickens which weigh between two and six pounds including their viscera, lower legs, and head, but not including their feathers and blood. As earlier mentioned, the preferred embodiment utilizes a drum 32 that is 35.3 inches in nominal diameter. The motor utilized for powering the apparatus develops 5 horsepower which is sufficient to drive rotary member 20 and the connected first and second conveyor lines each of which could be hundreds of feet long. Shackles are mounted on those lines at 6 inch intervals. The capacity of the equipment described in the preferred embodiment is approximately 7500 birds per hour.

Figure 15:
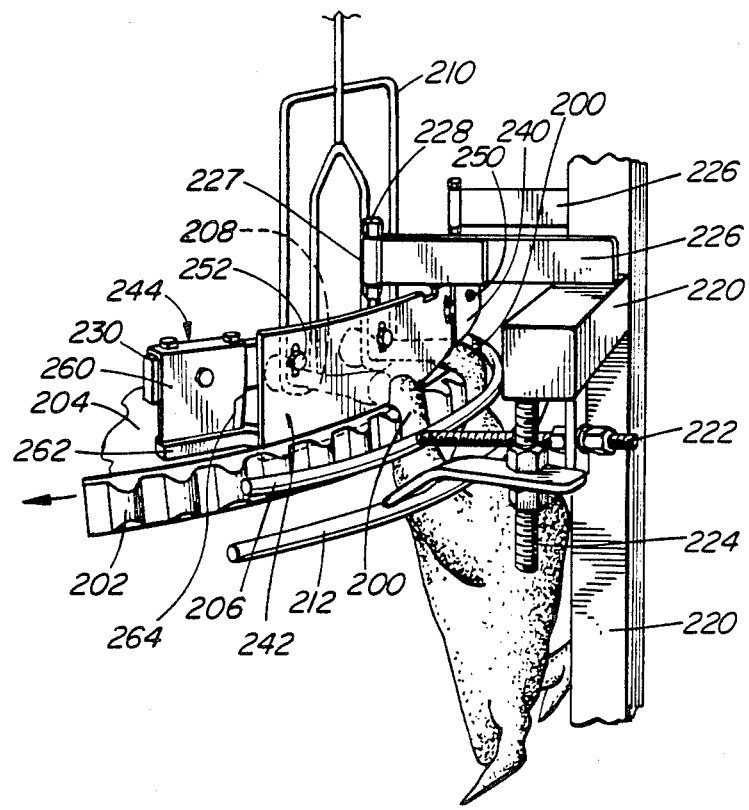
FIG. 15 is a perspective view of the knife mechanism mounted on the transfer apparatus.

FIGS. 15 to 20 inclusive illustrate an alternate preferred embodiment of the knife mechanism for removing the lower legs from each poultry carcass as the carcass moves around the rotary member. As can been seen in FIG. 15, the carriages 60 of the previously-described embodiment have been replaced by a construction in which the hock joints 200 of a carcass each rest between a pair of a set of equally-spaced teeth 202 on the periphery of a circular support disc 204. Circular disc 204 is inclined from a horizontal plane at an inclination sufficient during operation to achieve flexing of the legs of the carcass at the hock joints 200 as was achieved by carriages 60 of the previously described embodiment. A guide bar 206 holds each of the hock joints of the carcass between a respective adjacent pair of the teeth 202. The pair of lower legs 208 of the carcass are shown in outline in FIG. 15, that illustration showing the lower legs partially severed from the rest of the carcass during movement past a stationary knife mechanism that will be subsequently described. The outer end of the lower legs 208 of each carcass are held by a shackle 210 on which the carcass is conveyed to the circular support disc. Each carcass, held by a shackle 210, is introduced to the periphery of inclined circular disc 204 at a location adjacent the lowest elevation of the disc, such that the hock joints 200 are positioned in between the teeth 202. During rotation of the inclined disc 204 and the carcasses held by shackles 210, the periphery of the inclined disc 204 moves upwardly relative to the shackles 210, thereby raising hock joints 200 relative to the outer ends of the lower legs 208. This action causes the hock joints 200 to flex, achieving greatest flexure at the point of greatest elevation of disc 204 adjacent the knife mechanism, thereby enchancing the operation of the knife mechanism as described hereafter. A tensioning belt (not shown) applies a force to the stem of each shackle 210 in a manner similar to the force supplied by tensioning belt 97 in the previously-described embodiment; the force on each shackle 210 acts to apply a tensioning force to the pair of lower legs 208 of each carcass. A second guide bar 212, as shown in FIG. 15, presses against the back of the upper legs of each carcass. As also can be seen in FIG. 15, a frame member 220 of the transfer apparatus supports the guide bars 206 and 212 by means of selective positioning of a pair of nuts on threaded rods 222 and 224 respectively.

Figure 16:
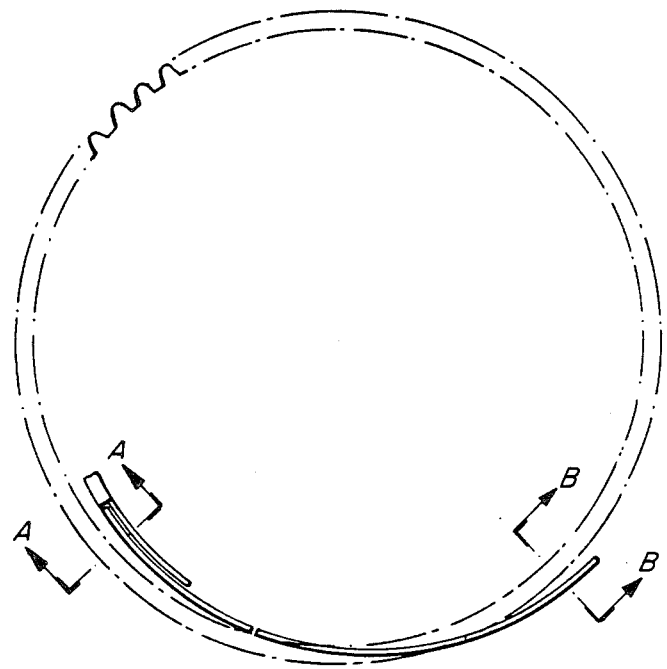
FIG. 16 is a plan view of the knife mechanism with the periphery of the transfer apparatus shown in outline, the view illustrating the relative position of the knife mechanism on the transfer apparatus.
Figure 17:
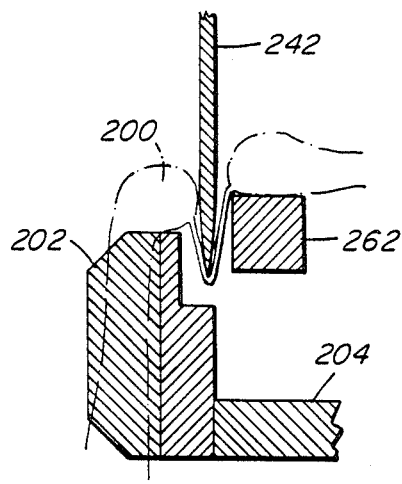
FIG. 17 is a view taken on the section A—A of FIG. 16.
Figure 18:
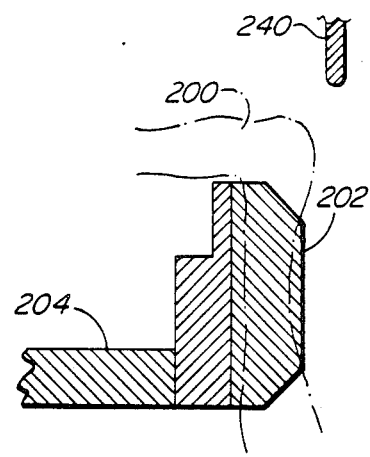
FIG. 18 is a view taken on the section B—B of FIG. 16.

A pair of steel bands 226 extend from frame member 220 toward the rotary member. One end of each of the steel bands 226 has a cylindrical loop 227 for holding a bolt 228 in a position normal to the band 226. The bolts 228 support an arcuate support bar 230 which is shown in outline in FIGS. 19 and 20. The support bar 230 has an arcuate shape corresponding approximately to the curvature on the periphery of the circular disc 204 positioned at an angle to that periphery, as illustrated in FIG. 16.

Figure 19:
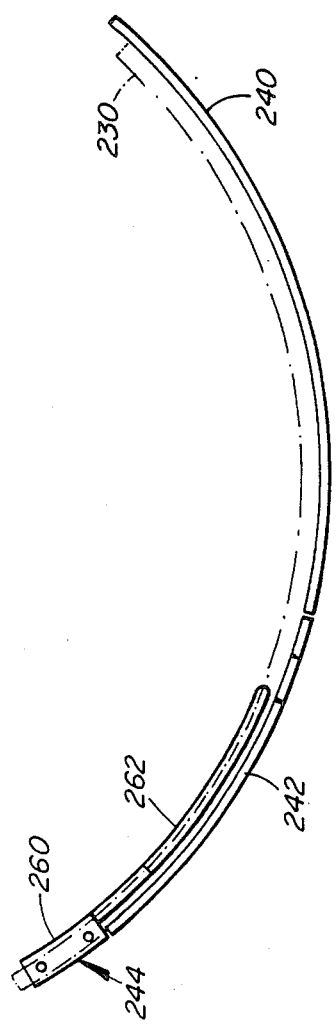
FIG. 19 is a plan view of the knife mechanism.
Figure 20:
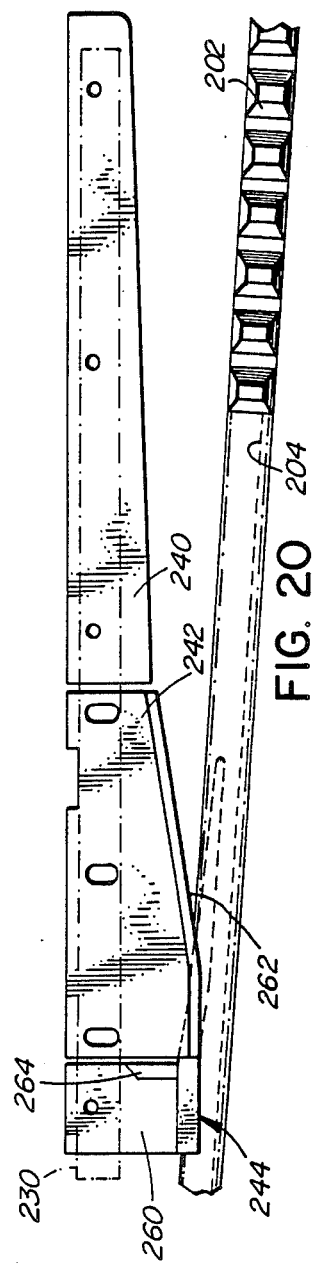
FIG. 20 is a side view of the knife mechanism.

Three blade members of the knife mechanism are bolted to support bar 230. From the leading end of the knife mechanism to the trailing end of that mechanism, those blade members are designated 240, 242, and 244, as can be seen in FIGS. 15, 19, and 20. The blade members are located over the point of greatest elevation of circular support disc 204, which corresponds with the point of greatest flexure of hock joints 200. The leading blade member 240 has an elongated arcuate contour as illustrated in FIGS. 19 and 20. The working edge of blade member 240, i.e. the lower edge in FIG. 20, is blunt and rides on the ball of the hock joint of a poultry carcass rather than cutting that joint; as the hock joint is moved along the working edge of blade member 240, that blade member forces itself between the ball and socket of the hock joint to increase the spacing between those two portions of the joint, connective tissue being pressed down between the ball and socket. The central blade member 242 is shorter in length but deeper than blade member 240, as best seen in FIG. 20. Blade member 242 has the same arcuate contour as is present on blade member 240. With respect to the FIG. 20, the lower edge of blade member 242 is sufficiently sharp to cut at least partially through any connective tissue extending between the two portions of the hock joint. The blade members 240 and 242 are bolted to support bar 230 by sets of bolts 250 and 252, respectively.

The third knife member 244 is comprised of a hooked support arm 260 having a finger 262 secured to it and extending parallel to its one face, the finger 262 appearing in FIGS. 15, 19 and 20. With respect to FIGS. 15 and 20, the finger 262 rides just above the surface of circular disc 204. As connective tissue is severed by the sharp lower edge of blade member 242 by movement of the hock joint along that sharp edge, the lower leg portion 208 rides upwardly on finger 262 to further stretch any remaining connective tissue and press that tissue more firmly against the cutting edge of blade member 242. Any connective tissue that is not severed after moving past blade member 242 moves against a sharp edge 264 on the forward end of support arm 260. The sharp edge 264 severs any remaining connective tissue between the lower leg 208 and the rest of the poultry carcass.

It should be appreciated that the subject invention is not restricted to the preferred embodiment but encompasses all embodiments that substantively take the inventive concept.

We claim:

1. A knife mechanism for severing the lower legs from a poultry carcass at the hock joint as the knife mechanism and carcass are moved relative to each other with the lower legs oriented generally normal to the working edges of the knife mechanism and fixed against movement normal to the relative movement, the knife mechanism comprising:

(a) a first knife means having a blunt working edge, that blunt working edge being adapted to extend into the hock joint of each leg to increase the spacing between the ball and the socket of the joint, connective tissue at the joint being thereby pressed between the ball and the socket of the joint;

(b) a second knife means having a sharp working edge, that sharp working edge being positioned so as to be in the path of the hock joint and being oriented generally parallel to the working edge of the first knife means, the sharp working edge of the second knife means being adapted to sever at least a portion of the connective tissue; and (c) a third knife means having a working edge oriented to press the connective tissue in a direction opposite to that in which that tissue is pressed by the working edges of the first and second knife members, at least a portion of the working edge of the third knife member being sharp and acting to sever any connective tissue not severed by the second knife means.

2. A knife mechanism as in claim 1, wherein the sharp portion of the working edge of the third knife member is the trailing portion of that working edge, and wherein the leading portion of that working edge is a blunt portion for guiding the connective tissue onto the sharp portion.

3. A knife mechanism as in claim 1, where the leading portion of the working edge of the second knife means commences at the same depth in the hock joint as the trailing portion of the working edge of the first knife means, and wherein the working edge of the second knife means is adapted to extend further into the hock joint than the working edge of the first knife means.

4. A knife mechanism as in claim 1, 2, or 3 wherein the working edge of the first knife means extends in-line with the working edge of the second knife means.

5. A knife mechanism as in claim 1, wherein the sharp portion of the working edge of the third knife means is oriented at more of an angle to the path of the hock joint than is the working edge of the second knife means.

6. A knife mechanism as in claim 5, wherein the sharp portion of the working edge of the third knife means is contacted by the connective tissue after that tissue has moved past the working edge of the second knife means.

7. A knife mechanism as in claim 1, wherein the working edge of the third knife means is laterally displaced from the working edge of the second knife means.

8. A knife mechanism as in claim 1, wherein the first and second knife means are integrally connected such that the leading portion of the working edge of the second knife means as an extension of the trailing portion of the working edge of the first knife means.

9. A knife mechanism as in claim 1, wherein the first second and third knife means are oriented so as to contact a poultry carcass being carried on the periphery of a circular rotary member.

10. A device for removing the legs of a poultry carcass, the device comprising:

(a) movable support means for supporting the carcass by the legs, the legs of the carcass being flexed at the hock joints over a rest member on the support means during movement of the carcass on the support means; and (b) a stationary knife mechanism having a working edge positioned so as to contact the hock joints while the carcass is moved on the support means, the knife mechanism having an initial blunt working edge portion which enters between the ball and socket of each hock joint to increase the separation between the ball and socket, the knife mechanism also having a first sharp working edge portion following the blunt portion for severing at least a portion of the connective tissue at the hock joint, the first sharp working edge extending further into the hock joint than the blunt working edge, the knife mechanism also having a second sharp working edge portion following the first sharp working edge portion for severing any remaining connective tissue at the hock joints, the second sharp working edge portion extending across the path of the connective tissue.

11. A device as in claim 10, the stationary knife mechanism is formed from three connected parts, the first part having the initial blunt working edge portion of the mechanism, the second part having the first sharp working edge portion of the mechanism, and the third part having the second sharp working edge portion of the mechanism, the third part also being comprised of a guide means for directing the remaining connective tissue at each hock joint to the second sharp working edge portion.

12. A device as in claim 10, the movable support means is a generally circular rotary member, and wherein each rest member is positioned on the periphery of the rotary member such the legs of each carcass extend generally toward the center of the rotary member.

13. A device as in claim 12, the working edge of the stationary knife mechanism is accurately contoured such that the leading portion of that working edge is a greater radial distance from the center of the circular rotary member than is the trailing portion of that working edge.

14. A device as in claims 10, 11 or 12 wherein the movable support means is inclined from a horizontal plane, and wherein the stationary knife mechanism is located over the point of greatest elevation of the movable support means.

* * * * *